3,346,047
MULTISTAGE WATERFLOOD
Harold L. Townsend, Dallas, and James M. McMillen, Arlington, Tex., assignors to Mobil Oil Corporation, a corporation of New York
No Drawing. Filed Aug. 19, 1965, Ser. No. 481,088
6 Claims. (Cl. 166—9)

This invention pertains to recovering petroleum from subterranean formations. More particularly, this invention pertains to recovering petroleum from a subterranean formation by flooding the formation with water.

The petroleum, more commonly called oil, accumulated in subterranean formations is recovered or produced therefrom through wells, called production wells, drilled into the subterranean formations. A large amount of the oil is left in a subterranean formation if produced only by primary depletion, i.e., where only initial formation energy is used to recover the oil. Where initial formation energy is inadequate or has become depleted, supplemental operations, often referred to as secondary recovery operations, are used to improve the extent of recovery of the oil. In the most successful and most widely used supplemental recovery operations, a fluid is injected through injection means, comprising one or more injection wells, and passed into the formation. Oil is displaced within and is moved through the formation, and is produced from production means, comprising one or more production wells, as the injected fluid passes from the injection means toward the production means. In a particular recovery operation of this sort, water is employed as the injected fluid and the operation is referred to as a waterflood. The injected water is referred to as the flooding water, as distinguished from the in situ, or connate, water.

Waterflooding is a useful method of secondary recovery but achieves relatively poor microscopic displacement of the oil within the subterranean formation. The relatively poor microscopic displacement is due to the property of immiscibility which the water has with the oil it seeks to displace within the formation. There is a relatively high interfacial tension between the water and the oil and, in some cases, an unfavorable contact angle made by the interface between the two liquids with the solid surface. As a result, the flooding water is unable to penetrate the micropores, or smaller pores, of the formation, and the oil in the smaller pores is not recovered. It has been suggested that surfactants be included in the water used to flood a subterranean reservoir to alter favorably the interfacial tension and the contact angle and thus increase the microscopic displacement of the in situ oil. The best previously used surfactants only lowered the interfacial tension between the water and the oil, e.g., about 32 dynes per centimeter, to about one dyne per centimeter. As a consequence, the use of such surfactants in a waterflood did not recover enough additional oil to pay the extra cost incurred. Thus, the process was uneconomical and did not gain widespread use.

It is an object of the invention to provide a method of recovering oil from a subterranean formation by waterflooding wherein low interfacial tensions are achieved between the oil being displaced and the flooding water.

It is a particular object of the invention to provide a method of forcing a surfactant into the in situ oil from juxtaposed treated flooding water whereby low interfacial tension between the water and the oil is realized, resulting in improved microscopic displacement of the oil by the flooding water.

Further objects and attendant advantages of the invention will be apparent from the following description.

In accordance with the invention, there is provided an improvement in a method for recovering oil from an oil-containing subterranean formation into which there is injected a flooding liquid through injection means and from which oil is produced through production means. The improvement comprises three steps of injecting various flooding liquids through the injection means. The first two of these steps are:

(1) Injecting a first slug of from 0.01 to 10 percent pore volume of an aqueous nonsaline solution containing a first concentration of a surfactant which is at least partially water soluble and preferentially oil soluble, and (2) Injecting a second slug of from 0.01 to 10 percent pore volume of an aqueous saline solution containing a second and lower concentration of the surfactant.

By saline solution is meant a solution of any inorganic salt which will "salt out," or reduce the solubility of, the surfactant in the aqueous phase. However, in practical oil field operations the saline solution will generally be a solution containing primarily sodium chloride.

In the above two steps, the first concentration of surfactant is at least as high as the saturation concentration for the surfactant in the saline solution. With mixture of these two solutions in the formation, the saline solution causes a reproportionment of the surfactant from the nonsaline solution into the oil phase, i.e., the surfactant is salted out of the nonsaline solution and is dissolved in the oil in the formation. As a result, a low interfacial tension between the oil and the saline solution is produced and effective displacement of the oil within the formation occurs.

The third step is:

(3) Injecting a third slug of at least 5.0 percent pore volume of brine to drive the nonsaline solution, the saline solution, and the oil toward the production well.

In the practice of the invention, each slug of the nonsaline solution, of the saline solution, and of the brine is injected into the formation one time each. However, the cycle of injecting each of these slugs respectively and alternately may be repeated one or more times to achieve a wider distribution of the low interfacial tension between the oil and the water and more nearly completely recover the oil from the subterranean formation. The cycle is repeated only if the residual oil in the particular formation indicates that it is economically feasible to do so. The usual engineering concepts of recovery versus the costs involved for the particular subterranean formation and in situ oil determine economic feasibility.

The preferred surfactant for use in the invention is an alkyl aryl oxypoly(ethoxy)ethanol having the following structural formula:

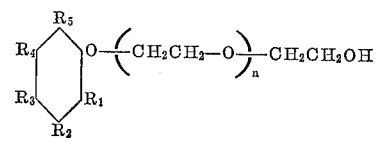

(1)

In this formula, $R_1$, $R_2$, $R_3$, $R_4$, or $R_5$ is either hydrogen or an alkyl hydrocarbon group. At least one of $R_1$, $R_2$, $R_3$, $R_4$, and $R_5$ is an alkyl hydrocarbon group containing at least 8 carbon atoms, and the total number of carbon atoms in the R groups taken together does not exceed 19. Further, in this formula, $n$ is a number as great as at least 2 and no greater than 6 when the total number of carbon atoms in the R groups is 8, and is one larger for each additional carbon atom above 8 in the total number of carbon atoms in the R groups. The alkyl aryl oxypoly(ethoxy)ethanol is commonly referred to as an alkyl aryl alcohol having the desired average number of ethylene oxide groups in its molecular structure. An example is nonyl phenol with 6 mols of ethylene oxide.

The oil solubility of the preferred surfactant depends upon the number of carbon atoms in the R groups. Increasing the total number of carbon atoms in the R groups increases the oil solubility of the surfactant. While more than 8 carbon atoms in the R groups tends to neutralize the effects of minor impurities in the surfactant, the lowest interfacial tensions are obtained with compounds having, in the R groups, only 8 or 9 carbon atoms concentrated in one of the R groups. Including more than 19 carbon atoms in the R groups increases the cost and adversely affects the reduction of interfacial tension between the solution containing the surfactant and the oil.

Conversely, the water solubility of the preferred surfactant depends upon the average number of ethylene oxide groups associated or reacted with the alkyl aryl substituent in the molecule. Increasing the average number of ethylene oxide groups increases the water solubility of the surfactant. The commercially available alkyl aryl oxypoly(ethoxy)ethanols are rarely pure compounds but are mixtures. Therefore, in Formula (1) $n$ represents the average number of ethylene oxide groups separately designated as poly(ethoxy) in the molecules of the surfactant, and is not restricted to whole numbers only. For example, some molecules of the surfactant mixture might contain three ethylene oxide groups; others, four; and still others, five. The average number of ethylene oxide groups designated by $n$ might be 3.9 in such a mixture.

In order to attain the desired low interfacial tension between the oil and the water phases, it is vital that the alkyl aryl oxypoly(ethoxy) ethanol have proper hydrophobe-hydrophil balance. The proper hydrophobe-hydrophil balance is achieved when the molecule contains a number $n$ of from 2 to 6, inclusive, ethylene oxide groups and only one alkyl group containing 8 carbon atoms, the remaining R groups being hydrogen. When the number of carbon atoms in the R groups is above 8, the compound contains one additional ethylene oxide group for each carbon atom above 8 to maintain the proper balance. To illustrate this maintenance of balance, when the alkyl group increases to a nonyl compound and one other R group increases from hydrogen to a —CH₃, i.e., 2 carbon atoms added, the average number $n$ of ethylene oxide groups required in the poly(ethoxy) portion of the molecule is at least 4 and no greater than 8.

The preferred alkyl aryl oxypoly(ethoxy) ethanols are those in which there is only one alkyl group which is an iso-octyl or iso-nonyl group. It is also preferred that the alkyl group be in the para position to the oxypoly(ethoxy) ethanol substituent on the phenyl ring.

It is preferred to add to the solutions containing the surfactant, and especially to the aqueous nonsaline solution, a hydrotrope. As mentioned previously, the surfactant employed is at least partially water soluble and preferentially oil soluble. Accordingly, difficulty may be encountered in dissolving sufficient surfactant in the solution, particularly the relatively high concentrations required in the nonsaline solution. By employing a hydrotrope in the solution, the surfactant is more readily dissolved. A preferred hydrotrope is an M dialkyl sulfosuccinate having the following structural formula:

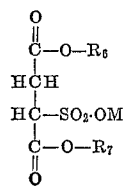

(2)

In this formula, M is a cation and is lithium, potassium, sodium, ammonium, anilinium, o-toluidinium, p-toluidinium, m-toluidinium, methylammonium, ethylammonium, n-propylammonium, iso-propylammonium, n-butylammonium, iso-butylammonium, sec-butylammonium, or tert-butylammonium. Further, in this formula, $R_6$ and $R_7$ are alkyl groups containing 5 to 16 carbon atoms each, inclusive. Preferably, however, they contain from 6 to 10 carbon atoms each, inclusive. The best results are obtained, ordinarily, when each alkyl group contains about 8 carbon atoms. Although it is preferred that the dialkyl groups $R_6$ and $R_7$ be the same, they do not necessarily have to be the same.

In general, sodium dialkyl sulfosuccinates are more economical than the other alkali metal sulfosuccinates. Suitable sodium dialkyl sulfosuccinates include sodium di(2-ethylhexyl) sulfosuccinate, sodium di-iso-octyl sulfosuccinate, sodium di-n-octyl sulfosuccinate, sodium di-iso-nonyl sulfosuccinate, sodium di-n-nonyl sulfosuccinate, sodium di-iso-heptyl sulfosuccinate, sodium di-n-heptyl sulfosuccinate, sodium di-iso-hexyl sulfosuccinate, sodium di-n-hexyl sulfosuccinate, sodium di-iso-decyl sulfosuccinate, and sodium di-n-decyl sulfosuccinate. Other alkali metal cations may be employed in the foregoing compounds.

Suitable ammonium dialkyl sulfosuccinates include ammonium di(2-ethylhexyl) sulfosuccinate, ammonium di-iso-octayl sulfosuccinate, ammonium di-n-octyl sulfosuccinate, ammonium di-iso-nonyl sulfosuccinate, ammonium di-n-nonyl sulfosuccinate, ammonium di-iso-heptyl sulfosuccinate, ammonium di-n-heptyl sulfosuccinate, ammonium di-iso-hexyl sulfosuccinate, ammonium di-n-hexyl sulfosuccinate, ammonium di-iso-decyl sulfosuccinate, and ammonium di-n-decyl sulfosuccinate.

Typical of suitable substituted ammonium dialkyl sulfosuccinates are the secondary butylammonium dialkyl sulfosuccinates. Suitable secondary butylammonium dialkyl sulfosuccinates include sec-butylammonium di-iso-octyl sulfosuccinate, sec-butylammonium di-n-octyl sulfosuccinate, sec-butylammonium di-iso-nonyl sulfosuccinate, sec-butylammonium di-n-nonyl sulfosuccinate, sec-butylammonium di-iso-heptyl sulfosuccinate, sec-butylammonium di-n-heptyl sulfosuccinate, sec-butylammonium di-iso-hexyl sulfosuccinate, sec-butylammonium di-n-hexyl sulfosuccinate, sec-butylammonium di-iso-decyl sulfosuccinate, and sec-butylammonium di-n-decyl sulfosuccinate.

The sodium di(2-ethylhexyl) sulfosuccinate is preferred.

The alkali metal dialkyl sulfosuccinates or the ammonium dialkyl sulfosuccinates are readily synthesized by reacting maleic anhydride with an alcohol having the desired length alkyl groups and sulfonating with an alkali metal bisulfite or an ammonium bisulfite. When this method of preparation is used, there is realized the preferred embodiment wherein $R_6$ and $R_7$ are the same. The reaction forming sodium dialkyl sulfosuccinate is illustrative and is depicted below:

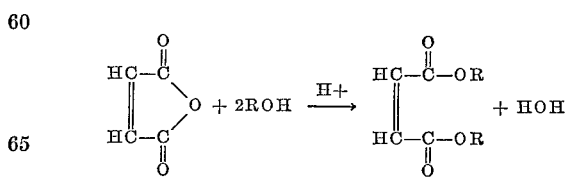

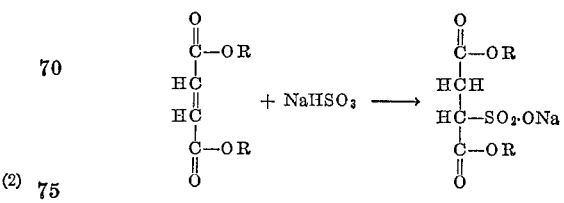

The substituted ammonium dialkyl sulfosuccinates may be obtained by converting the sodium salt to the hydrogen form, using an acid-ion-exchange resin, followed by neutralization with the appropriate amine.

As noted, the first concentration of the surfactant in the nonsaline solution should be at least as high as the saturation concentration for the same surfactant in the saline solution. Preferably, this concentration is higher than the saturation concentration in the saline solution. The saturation concentration may be determined empirically by saturating with the surfactant a portion of brine having the same salinity as that of the saline solution. Since the saturation concentration decreases as salinity increases, the first concentration of surfactant employed varies inversely with the concentration of inorganic salt, e.g., sodium chloride, in the aqueous saline solution. When a higher concentration of the salt is employed in the aqueous saline solution, a lower concentration of the surfactant may be employed in the aqueous nonsaline solution and still cause the reproportionment of the surfactant from the nonsaline solution into the oil. For example, when a sodium chloride concentration of about 3 percent by weight is employed in the aqueous saline solution, a first concentration of from about 0.2 to about 0.3 percent by weight of the surfactant can be employed in the aqueous nonsaline solution. On the other hand, when a sodium chloride concentration of 0.8 percent or less by weight is employed in the second slug, a first concentration of from about 0.8 to about 1.0 percent by weight of the surfactant can be employed in the aqueous nonsaline solution. A first concentration of surfactant in the nonsaline solution as low as 0.1 percent by weight may be employed when the concentration of sodium chloride is sufficiently high to effect reproportionment of surfactant from the nonsaline solution into the oil phase.

The second concentration of surfactant which is required in the saline solution is less than the first concentration required in the nonsaline solution and may be as low as 0.001 percent by weight. We have found 0.05 percent by weight to be a satisfactory concentration of the surfactant in the saline solution. However, it may be desirable to employ the second concentration of surfactant in the saline solution up near the saturation concentration therefor. This reduces the dilution effect when mixed with the nonsaline solution and increases the reproportionment of surfactant into the oil. For example, a concentration as high as 0.2 percent by weight may be employed.

A concentration of hydrotrope of from 0.1 to 0.5 percent by weight is employed in the aqueous nonsaline solution in order to help dissolve and keep in solution the required concentration of the surfactant. A somewhat lower concentration of from 0.01 to 0.4 percent by weight of the hydrotrope is employed in the saline solution to keep in solution the lower concentration of the nonionic surfactant and, in the case of M dialkyl sulfosuccinate, to induce improved rheological properties.

The concentration of sodium chloride which may be employed in the second slug, or saline solution, may vary widely, e.g., from 0.1 percent by weight to a saturated solution. Therefore, whatever brine is conveniently available may be employed in the method of the invention.

The efficacy of the method of the invention is reducing interfacial tensions between oil and water is illustrated in Example 1.

*Example 1*

A miniature drop of hexadecane, simulating oil, was formed on a quartz plate in the presence of an aqueous non-saline solution of 0.05 percent by weight of nonyl phenyl oxytri(ethoxy)ethanol and 0.4 percent by weight of sodium di(2-ethylhexyl) sulfosuccinate. The interfacial tension as observed and calculated, employing the sessile drop method of measurement, was 0.5 dyne per centimeter. When brine was carefully added to the nonsaline solution to bring the sodium chloride concentration up to 0.75 percent by weight, the interfacial tension decreased to approximately $10^{-3}$ dynes per centimeter.

The efficacy of the method of the invention in increasing the recovery of oil is demonstrated in Example 2.

In Example 2, a core sample having some striations therein was employed to simulate the subterranean formation. The core sample was a Berea sandstone core sample which had been stabilized by being treated with a sodium carbonate flux and being fired to approximately 1300° C. to insure chemical neutrality. The core sample had physical properties of approximately the following values: a gas permeability of 600 millidarcies, a porosity of 0.22, a length of 31 centimeters, an area of 19.4 square centimeters, and a pore volume of 133 cubic centimeters. The core sample was put into a standard sleeve mounting—held in a Hassler cell with 250-pound sleeve pressure applied. The flood tests were carried out in a temperature-controlled box at 25° C. ±0.1° C.

*Example 2*

In this example, an oil phase was flooded from a core sample. The core sample was flushed to equilibrium conditions with carbon dioxide, then saturated with distilled water. Water was flowed through the core sample until equilibrium pressure drop across the core sample was obtained. From the equilbrium pressure drop, the liquid permeability was calculated, employing Darcy's law. An oil phase, i.e., hexadecane, was introduced into the core sample by capillary desaturation at a pressure of 65 centimeters of mercury, the water displaced by the oil being measured to determine oil saturation. Oil saturation was 77 percent. Next, a simulated waterflood was carried out on the core sample.

In the simulated waterflood, water was passed through the core sample at a measured flow rate, pressure, and volume. The flow rate was maintained constant at 5 cubic centimeters per hour with a positive displacement Ruska pump. A pump rate of 1 cubic centimeter per hour gave a velocity of 0.182 foot per day. The water was flowed through the core sample until no more oil was produced. The cumulative volume of oil produced from the sample by the water was measured, and reported in percent of the original oil in place for ease of comparison. Approximately 38.0 percent of the oil was recovered by the waterflood.

Following the passage of the water through the core sample, a slug of aqueous nonsaline solution containing 1 percent by weight of nonyl phenyl oxytri(ethoxy)ethanol and 0.4 percent by weight of sodium di(2-ethylhexyl) sulfosuccinate was passed through the core sample at the same measured flow rate, at measured pressure, and in measured volume. The flow rate was controlled similarly as described above in connection with the water. The flow rate was maintained constant and the aqueous nonsaline solution was flowed through the core sample until no more oil was being produced. The cumulative volume of oil produced from the core sample at the conclusion of the flood by the aqueous nonsaline solutine was measured. The amount of oil recovered was 44.3 percent of the oil originally in the core sample.

Following the passage of the aqueous nonsaline solution through the core sample, a slug of aqueous saline solution containing a concentration of 0.05 percent by weight of nonyl phenyl oxytri(ethoxy)ethanol, 0.4 percent by weight of sodium di(2-ethylhexyl) sulfosuccinate, and 0.75 percent by weight of sodium chloride was passed through the core sample at the same measured flow rate, at measured pressure, and in measured volume. The flow rate was controlled similarly as described above. The flow rate was maintained constant, and the aqueous saline solution was flowed through the core sample until no more oil was being produced. The cumulative volume of oil produced from the core sample at the conclusion of the flood by the aqueous saline solution was measured. The amount of oil recovered was 65.7 percent.

Following the passage of the aqueous saline solution through the core sample, a slug of brine containing 3 percent by weight of sodium chloride failed to recover any additional oil.

However, when a subsequent slug of the same nonsaline solution was passed through the core sample under the same test conditions, the cumulative oil recovery increased to 66.2 percent of the oil initially in the core. Further, when a second slug of the saline solution was passed through the core sample under the same test conditions, the cumulative oil recovery increased to 73.5 percent. Thus, it is apparent that repeating the slugs through more than one cycle as described hereinbefore improves the microscopic displacement and the total amount of oil which can be recovered.

Having thus described our invention, it will be understood that such description has been given by way of illustration and example and not by way of limitation, reference for the latter purpose being had to the appended claims.

What is claimed is:

1. In a method of recovering oil from an oil-containing subterranean formation wherein a fluid is injected into an injection means and into said formation, and oil is produced therefrom through a production means, the improvement comprising the steps of:
   (a) injecting through said injection means a first slug of from 0.01 to 10 percent pore volume of an aqueous nonsaline solution containing a first concentration of a surfactant which is partially water soluble and preferentially oil soluble;
   (b) injecting through said injection means a second slug of from 0.01 to 10 percent pore volume of an aqueous saline solution containing a second concentration lower than said first concentration of said surfactant, said first concentration being at least as high as the saturation concentration for said surfactant in said saline solution; and
   (c) injecting through said injection means a third slug of at least 5.0 percent pore volume of brine to drive said nonsaline solution, said saline solution, and said oil toward said production means.

2. In a method of recovering oil from an oil-containing subterranean formation wherein a fluid is injected into an injection means and into said formation, and oil is produced therefrom through a production means, the improvement comprising the steps of:
   (a) injecting through said injection means a first slug of from 0.01 to 10 percent pore volume of an aqueous nonsaline solution containing a first concentration of from 0.1 to 1.0 percent by weight of an alkyl aryl oxypoly(ethoxy)ethanol surfactant having the following structural formula:

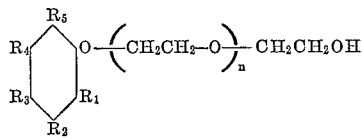

where
   $R_1$, $R_2$, $R_3$, $R_4$, and $R_5$ are selected from the group consisting of hydrogen and an alkyl hydrocarbon group, at least one of $R_1$, $R_2$, $R_3$, $R_4$, and $R_5$ is an alkyl hydrocarbon group containing at least 8 carbon atoms, and the total number of carbon atoms in the R groups taken together does not exceed 19, and
   $n$ is a number as great as at least 2 and no greater than 6 when said total number of carbon atoms in said R groups is 8 and is one greater for each additional carbon atom above 8 in said total number of carbon atoms in said R groups;
   (b) injecting through said injection means a second slug of from 0.01 to 10 percent pore volume of an aqueous saline solution containing a second concentration of said surfactant which is less than said first concentration and which ranges from 0.001 percent by weight to the saturation concentration for said surfactant in said saline solution, and a concentration of at least 0.1 percent by weight of sodium chloride, said first concentration of surfactant in the slug of step (a) being at least as high as the saturation concentration of said surfactant at said concentration of said sodium chloride in said saline solution of step (b); and
   (c) injecting through said injection means a third slug of at least 5.0 percent pore volume of brine to drive said nonsaline solution, said saline solution, and said oil toward said production means.

3. The method of claim 2 wherein said first slug of said nonsaline solution contains a hydrotrope in addition to said first concentration of said alkyl aryl oxypoly(ethoxy)ethanol surfactant.

4. The method of claim 2 wherein said first slug of said nonsaline solution contains, in addition to said first concentration of said alkyl aryl oxypoly(ethoxy)ethanol surfactant, from 0.1 to 0.5 percent by weight of an M dialkyl sulfosuccinate of the following structural formula:

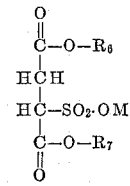

where
   M is a cation selected from the group consisting of $Li^+$, $K^+$, $Na^+$, $NH_4^+$, anilinium, o-toluidinium, p-toluidinium, m-toluidinium, methylammonium, ethylammonium, n-propylammonium, iso-propylammonium, n-butylammonium, iso-butylammonium, sec-butylammonium, and tert-butylammonium,
   $R_6$ is an alkyl group containing 5 to 16 carbon atoms, inclusive, and
   $R_7$ is an alkyl group containing 5 to 16 carbon atoms, inclusive; and
   said second slug of said saline solution contains, in addition to said second concentration of said surfactant, from 0.01 to 0.4 percent by weight of said M dialkyl sulfosuccinate.

5. In a method of recovering oil from an oil-containing subterranean formation wherein a fluid is injected into an injection means and into said formation, and oil is produced therefrom through a production means, the improvement comprising the steps of:
   (a) injecting through said injection means a first slug of from 0.01 to 10 percent pore volume of an aqueous nonsaline solution containing a first concentration of from 0.1 to 1.0 percent by weight of nonyl phenyl oxytri(ethoxy)ethanol and 0.1 to 0.5 percent by weight of sodium di(2-ethylhexyl)sulfosuccinate;
   (b) injecting through said injection means a second slug of from 0.01 to 10 percent pore volume of an aqueous saline solution containing a second concentration less than said first concentration of step (a) and from 0.001 to 0.2 percent by weight of said nonyl phenyl oxytri(ethoxy)ethanol, 0.01 to 0.4 percent by weight of said sodium di(2-ethylhexyl) sulfosuccinate, and more than 0.1 percent by weight of sodium chloride; and
   (c) injecting through said injection means a third slug of at least 5.0 percent pore volume of brine to drive said nonsaline solution, said saline solution, and said oil toward said production means.

6. The method of claim 5 wherein said first slug of said aqueous nonsaline solution, said second slug of said aqueous saline solution, and said third slug of said brine are injected respectively, more than once.

References Cited
UNITED STATES PATENTS

| | | | |
|---|---|---|---|
| 2,792,894 | 5/1957 | Graham | 166—9 X |
| 2,800,962 | 7/1957 | Garst | 166—9 |
| 2,866,507 | 12/1958 | Bond | 166—9 |
| 3,051,234 | 8/1962 | Kyte | 166—9 |
| 3,096,820 | 7/1963 | Bernard | 166—9 |
| 3,100,524 | 8/1963 | Beeson | 166—9 |
| 3,170,514 | 2/1965 | Harvey | 166—9 |
| 3,302,712 | 2/1967 | Townsend | 166—9 |

CHARLES E. O'CONNELL, *Primary Examiner.*

NILE C. BYERS, JR., *Examiner.*

UNITED STATES PATENT OFFICE
CERTIFICATE OF CORRECTION

Patent No. 3,346,047                      October 10, 1967

Harold L. Townsend et al.

It is hereby certified that error appears in the above numbered patent requiring correction and that the said Letters Patent should read as corrected below.

Column 4, line 21, for "sufosuccinate" read -- sulfosuccinate --; line 28, for "iso-octayl" read -- iso-octyl --; line 42, after "di-iso-heptyl sulfosuccinate," insert -- sec-butylammonium di-n-heptyl sulfosuccinate --; column 5, line 62, for "is" read -- in --; column 6, line 58, for "solutine" read -- solution --.

Signed and sealed this 22nd day of October 1968.

(SEAL)
Attest:

Edward M. Fletcher, Jr.                      EDWARD J. BRENNER

Attesting Officer                           Commissioner of Patents